United States Patent Office 3,695,829
Patented Oct. 3, 1972

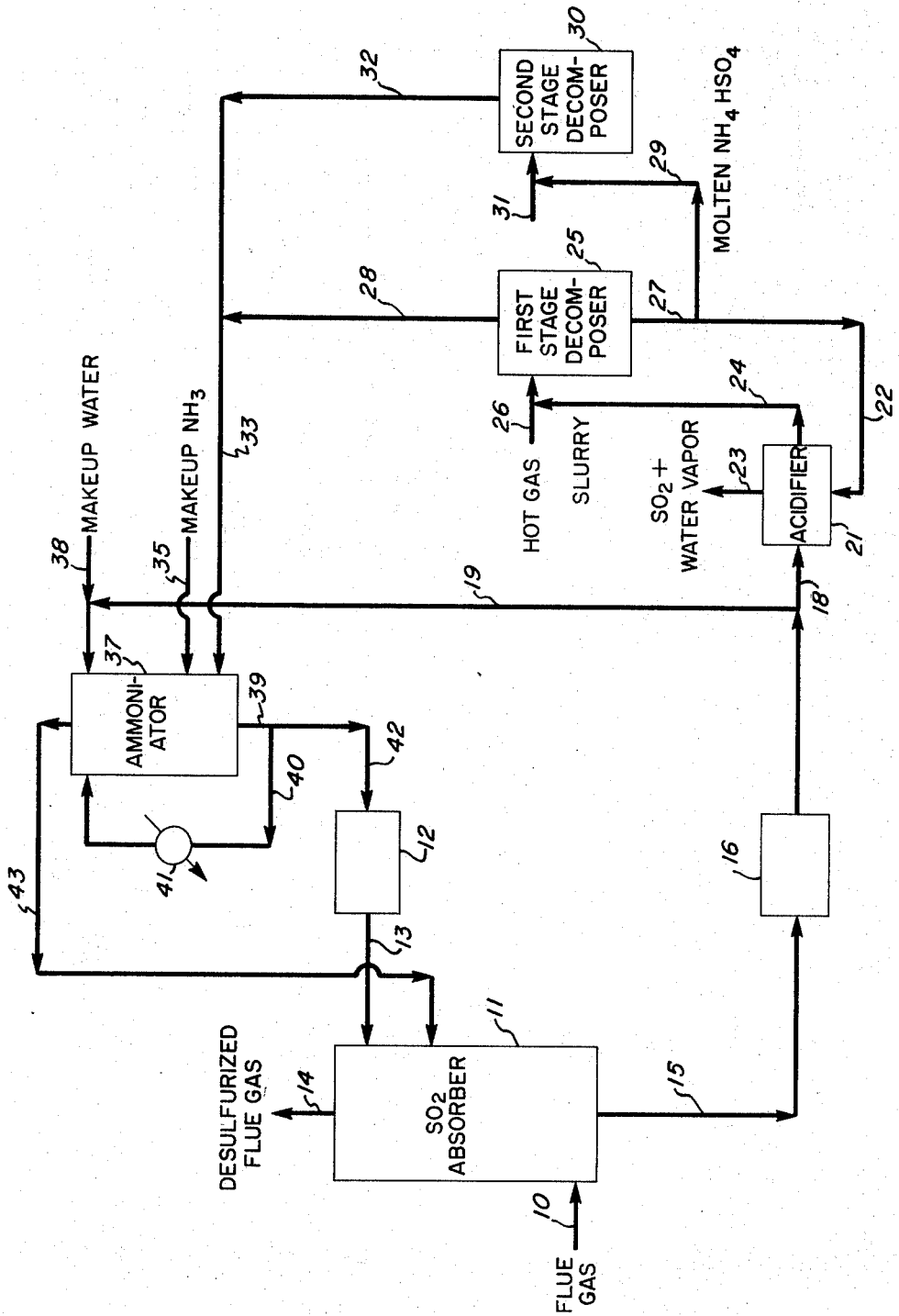

3,695,829
TWO STAGE AMMONIUM SULFATE DECOMPOSITION IN FLUE GAS DESULFURIZATION PROCESS
Lindsay I. Griffin, Jr., Summit, and Albert B. Welty, Jr., Westfield, N.J., assignors to Esso Research and Engineering Company
Continuation-in-part of application Ser. No. 869,226, Oct. 26, 1969. This application June 1, 1970, Ser. No. 41,941
Int. Cl. C01b 17/50, 17/60
U.S. Cl. 423—242
2 Claims

ABSTRACT OF THE DISCLOSURE

Buildup of sulfate ions in a flue gas desulfurization process employing an aqueous ammoniacal absorbent is prevented by reducing a portion of the sulfate to sulfur dioxide. Sulfur dioxide is removed from flue gas by absorption in an aqueous solution of ammonium sulfite or ammonia. Some oxidation of tetravalent sulfur to hexavalent sulfur takes place. At least a portion of the absorber effluent solution is regenerated by acidification with ammonium bisulfate to liberate sulfur dioxide and to form an aqueous ammonium sulfate-ammonium bisulfate slurry. This slurry is decomposed in two stages. In the first stage, water is evaporated and the ammonium sulfate content is decomposed into ammonium bisulfate. A major portion of this ammonium bisulfate is returned to the acidifier. A minor portion, equivalent to the amount of sulfite oxidized to sulfate in the sulfur dioxide absorber plus the amount of sulfur trioxide in the entering flue gas, is decomposed into a completely gaseous product mixture comprising ammonia, nitrogen, and sulfur dioxide. The gaseous decomposition products from the two decomposition stages are used in the preparation of fresh aqueous absorbent solution.

CROSS-REFERENCE TO RELATED APPLICATIONS

This application is a continuation-in-part of our copending application Ser. No. 869,226, filed Oct. 26, 1969, now Pat. No. 3,645,671, issued Feb. 29, 1972.

Reference is also made to the copending application of Albert B. Welty, Jr., Ser. No. 7108, filed Jan. 30, 1970, for a detailed description of an ammonium sulfate decomposer and process which is useful in the practice of this invention.

BACKGROUND OF THE INVENTION

This invention relates to processes for removal of sulfur dioxide from flue gas, and more particularly to wet processes in which sulfur dioxide is removed by contact with an aqueous absorbent.

Sulfur dioxide has become a major pollutant of the atmosphere, particularly in urban areas. The presence of sulfur dioxide in the atmosphere is due primarily to the combustion of fossil fuels, i.e., coal and oil, which contain sulfur. Electric power plants constitute a major source of sulfur dioxide pollution of the atmosphere.

Various processes have been suggested for removal of sulfur dioxide from flue gas, although none has gained a general industry acceptance to date. These processes may be grouped generally as wet processes and dry processes. Wet processes are those which employ an absorbent solution, usually aqueous, for the removal of sulfur dioxide from a gas stream.

A flue gas desulfurization process has several requirements. First, it must be capable of removing most of the sulfur dioxide content of flue gas, preferably 90% or more of the $SO_2$ present, under widely varying load conditions. Secondly, it should not create any air or water pollution problems. Third, the process should be easy to operate and maintain. The process should have a low net cost. In most instances this requires the production of a salable by-product. The process should be capable of incorporation into existing power plants if it is to achieve maximum application. This requirement favors wet processes, which operate at a low temperature and therefore can be placed after the conventional air preheater in which incoming air for combustion is heated by the hot flue gas. Dry processes usually require much higher operating temperature and therefore must be inserted ahead of the preheater and integrated with the power plant.

Various wet processes using aqueous ammonia or an aqueous ammonium salt which is not fully acidified, such as ammonium sulfite, have been suggested in the art. Such processes are described, for example, in Hixson et al. U.S. Pat. No. 2,405,747, isued Aug. 13, 1946, and Johnstone et al. U.S. Pats. Nos. 2,134,481 and 2,810,627, issued Oct. 25, 1938 and Oct. 22, 1957, respectively. Hixson describes the use of aqueous ammonia as the absorbent. Johnstone U.S. Pat. No. 2,134,481 uses aqueous ammonium sulfite as the absorbent. Another process using ammonium sulfite solution is described in our copending application Ser. No. 869,226.

One problem which occurs in absorbing sulfur dioxide from flue gas as aqueous ammoniacal solutions is that a portion of the tetravalent sulfur in the absorber is oxidized to the hexavalent state. This is because a small amount of oxygen is present in flue gas. Thus, the absorber effluent solution in the above processes contains a small amount of ammonium bisulfate in addition to a much larger amount of ammonium bisulfite. On regeneration of the effluent solution, the bisulfite is acidified, liberating sulfur dioxide. However, bisulfate does not react with the acidifying agent, and hence hexavalent sulfur in the form of either sulfate or bisulfate ions builds up in the system.

Various means for getting rid of excess sulfate have been disclosed in the art. Hixson et al. U.S. Pat. No. 2,405,747, mentioned above, suggests removing excess ammonium bisulfate from the system and reacting it with limestone to make calcium sulfate. The previously-mentioned Johnstone et al. U.S. Pat. No. 2,810,627 proposes oxidation and stripping of ammonium sulfite-ammonium bisulfite absorber effluent solution with air to liberate sulfur dioxide and form ammonium sulfate. Since there is not a high demand for either of these materials at the present time, more valuable by-products must be formed from the excess ammonium sulfate.

This invention provides an improved process for the conversion of the hexavalent sulfur formed in the absorber back to sulfur dioxide. This prevents the buildup of sulfate in the system, and enhances the yield of sulfur dioxide as compared to prior art processes, which in turn increases the amount of useful by-product, such as sulfur or sulfuric acid, obtained.

SUMMARY OF THE INVENTION

The present invention provides a novel means for decomposing excess sulfate formed in the flue gas desulfurization process using an aqueous ammoniacal absorbent solution as the absorbent for removing sulfur dioxide from flue gas.

According to the present invention, sulfur dioxide is removed from a flue gas stream by contacting the stream with an aqueous ammoniacal absorbent solution capable of reaction with sulfur dioxide, whereby a major portion of the sulfur dioxide in the flue gas is absorbed in this solution and a minor portion of the tetravalent sulfur in the absorber is oxidized to the hexavalent state; withdrawing a flue gas stream of reduced sulfur dioxide content and an absorber effluent solution comprising ammonium bisulfite and ammonium bisulfate; acidifying at least a portion of the absorber effluent solution with ammonium bisulfate, thereby liberating sulfur dioxide and forming an aqueous mixture containing ammonium sulfate and ammonium bisulfate; evaporating the water content of said aqueous mixture; decomposing the ammonium sulfate in said mixture into ammonium bisulfate and ammonia in a first decomposition stage; returning a major portion of the ammonium bisulfate thus produced to the acidifier and decomposing a minor portion of the ammonium bisulfate in a second decomposition stage into an entirely gaseous product mixture comprising ammonia, nitrogen, and sulfur dioxide; and absorbing the ammonia and sulfur dioxide in the decomposition products in an aqueous medium to make fresh absorbent solution.

THE DRAWING

This invention will now be described in further detail with reference to the accompanying drawing, in which the sole figure is a flow sheet of a preferred embodiment of the process, using an aqueous ammonium sulfite solution as the absorbent.

DESCRIPTION OF THE PREFERRED EMBODIMENT

This invention provides improved means for preventing sulfate buildup in a flue gas desulfurization system employing an aqueous ammoniacal absorbent solution for the removal of sulfur dioxide from flue gas.

Flue gas is generated by burning a carbonaceous fuel, e.g., oil or coal containing chemically combined sulfur, usually with an excess of air in a furnace. The furnace may be a conventional electric power generating furnace. The sulfur dioxide content of the flue gas depends on the sulfur content of the fuel, and is typically about 0.2% to 0.3% by volume of the flue gas. In addition, the flue gas contains oxygen due to the use of excess air, a trace amount of sulfur trioxide, and substantial quantities of nitrogen, carbon dioxide and water vapor.

Flue gas is treated according to this invention with an aqueous ammoniacal absorbent solution to remove sulfur dioxide. First, the hot flue gas from the furnace is cooled to a suitable temperature for entering a sulfur dioxide absorber. Flue gas desulfurization systems employing aqueous ammoniacal absorbents are disclosed in Hixson et al. U.S. Pat. No. 2,405,747, patented Aug. 13, 1946; Johntone U.S. Pat. No. 2,134,481, issued Oct. 25, 1938; and the above-mentioned copending applications Ser. No. 869,226. The Hixson et al. patent discloses the use of aqueous ammonia as the absorbent; while the Johnstone patent and the copending applications disclose the use of an aqueous ammonium sulfite solution. The sulfur dioxide absorption procedures according to any of these disclosures may be used in the practice of the present invention, and the procedure disclosed in our copending application Ser. No. 869,226 is preferred. The preferred absorbent solution contains about 11 to about 17 moles of ammonia and from about 6.5 to about 11 moles of sulfur dioxide per 100 moles of water. The $NH_3:SO_2$ mole ratio must be greater than 1:1, and is preferably slightly less than 2:1. In addition, the absorbent solution generally contains some $SO_3$ (principally as sulfate ions) as a result of oxidation within the sulfur dioxide absorber and recirculation of solution as will be explained in detail.

Some oxidation of tetravalent sulfur to the hexavalent state takes place in the sulfur dioxide absorber, due to the presence of free oxygen in the flue gas. The amount of tetravalent sulfur oxidized is generally about 5 to about 20%, and typically about 10%, of the total quantity of tetravalent sulfur added to the absorbent solution in the sulfur dioxide absorber. Thus, the absorber effluent solution contains ammonium bisulfite as its principal solute, but also contains small amounts of ammonium bisulfate. Flue gas of substantially reduced sulfur dioxide content, i.e., no more than about 10% of the original sulfur dioxide content, is discharged into the atmosphere.

The feed rate of fresh absorbent solution into the sulfur dioxide absorber is approximately proportional to the rate at which sulfur dioxide in the flue gas is introduced into the sulfur dioxide absorber. The sulfur dioxide rate in turn is dependent on the total flue gas rate, which in a typical electric power plant varies cyclically during the course of a day as demands on the power plant go up and down, and on the sulfur dioxide content of the flue gas, which is dependent on the sulfur content of the fuel.

Fresh absorbent solution may be fed to the sulfur dioxide absorber from a holding tank, and the absorber effluent solution may be delivered into a second holding tank. Solution may be withdrawn from the second holding tank for regeneration of sulfur dioxide at a constant flow rate, so that the entire system with the exception of the sulfur dioxide absorber operates at constant flow rate.

In a preferred embodiment, absorber effluent solution is withdrawn from the second holding tank at a constant flow rate and is divided into two portions. The first portion flows to an acidifier where it is treated to liberate sulfur dioxide. The second portion is used without further treatment to make up fresh absorbent solution, as will be described hereinafter.

The first portion of the absorber effluent solution is acidified with an excess of hot molten ammonium bisulfate in an acidification zone or acidifier, which is operated at a temperature of about 200° to 225° F. Heat is supplied to the acidifier via the hot molten ammonium bisulfate. A gas stream comprising sulfur dioxide and water vapor is removed overhead from the acidifier. This gas stream, which is considerably richer in sulfur dioxide than the original flue gas, may be treated according to conventional procedures to remove the water vapor therefrom, and the sulfur dioxide may then be converted either to sulfur or to sulfuric acid.

Also formed in the acidifier is an aqueous mixture comprising water, ammonium sulfate, and ammonium bisulfate. Preferably, this aqueous mixture is a slurry containing dissolved ammonium bisulfate and both dissolved and undissolved ammonium sulfate. The aqueous mixture comprising ammonium sulfate and ammonium bisulfate formed in the acidifier may be a solution if desired, but generally a pumpable slurry is preferred.

The next operation is to evaporate the water from the aqueous mixture formed in the acidifier, and to decompose the ammonium sulfate therein into ammonium bisulfate and water. This is preferably done in a single step, in which the aqueous slurry is sprayed into a stream of hot flowing combustion gases which may be formed by the combustion of a fossil fuel such as fuel oil. Water is evaporated first; this cools the gas stream considerably. Decomposition of ammonium sulfate then takes place in the temperature range of about 650° to about 800° F. Ammonium sulfate is decomposed into ammonium bisulfate and water at these temperatures; the amount of side reactions, i.e., further decomposition of ammonium bisulfate, taking place at these temperatures is comparatively small. The dehydrated salt mixture is in the form of droplets of material entrained in a gas stream which comprises combustion products and ammonia. These droplets are coalesced and collected in a pool at the bottom of the decomposer. The major portion of this salt product, primarily ammonium bisulfate, is returned in molten form to the acidifier. The gaseous product stream comprising ammonia and hot combustion gases is withdrawn overhead. This decomposition zone is the first stage decomposition zone in the practice of this invention.

A minor portion of the molten salt product is decomposed according to this invention in a second stage decomposition zone into an entirely gaseous product mixture comprising ammonia, nitrogen, sulfur dioxide and water vapor. The amount of salt decomposed in this second stage decomposer is such as to prevent either buildup or depletion of hexavalent sulfur (i.e., sulfate and bisulfate) in the system, and is equivalent to the amount of tetravalent sulfur oxidized to the hexavalent state in the sulfur dioxide absorber plus the amount of sulfur trioxide in the flue gas entering this absorber. This second stage decomposition zone is maintained at a temperature of about 750° to about 950° F., preferably by means of hot non-oxidizing gases, as more fully described in Bonfield et al. U.S. Pat. No. 3,282,646. Alternatively, the second stage can be electrically heated.

The gaseous products from the two decomposer stages are contacted in an ammoniator with the second portion of absorber effluent solution described earlier. The resulting product is fresh absorbent solution, which is returned to the first holding tank and withdrawn therefrom as needed for contacting flue gas. The reaction taking place in the ammoniator is essentially a reaction between the ammonia of the decomposer gaseous product with ammonium bisulfite, which is the principal constituent of the absorber effluent solution. This forms ammonium sulfite, which is the primary constituent of the fresh absorbent solution. The sulfur dioxide content of the gases entering the ammoniator is also absorbed in this solution. The bisulfate in the absorber effluent solution is converted into sulfate by reaction with ammonia. Thus, the fresh absorbent solution contains small amounts of ammonium sulfate, in addition to much larger quantities of ammonium sulfite. Also present in the preferred solution are minor quantities of ammonium bisulfite, since the preferred $NH_3:SO_2$ mole ratio is slightly less than 2:1.

The entire process of the present invention is preferably conducted on a continuous basis. When the source of flue gas is an electric power palnt, the gas flow rate is generally variable over the course of a day, depending on the instantaneous load on the power plant. The feed rate for fresh absorbent solution entering the absorption zone is approximately proportional to the rate at which sulfur dioxide enters the absorber. It is desirable to place holding tanks in the fresh absorbent solution line and in the absorber effluent solution line, so that the entire system with the exception of the sulfur dioxide absorber may be operated at constant flow rate.

It is possible according to the present invention to use aqueous ammonia instead of aqueous ammonium sulfite as the abosrbent.

This invention will now be described further with reference to the drawing.

Referring to the sole figure, flue gas containing about 0.2 to about 0.3% by volume of sulfur dioxide plus small amounts of sulfur trioxide is introduced via line 10 into sulfur dioxide absorber 11. The flue gas stream is contacted in absorber 11 with fresh absorbent solution containing ammonium sulfite as its principal solute. This solution is conveyed from holding tank 12 through feed line 13 into absorber 11. All of the absorbent solution is shown as entering the top of the absorber, although the solution may be supplied at two or more vertically spaced locations. The fresh solution feed rate is substantially proportional to the rate of flow of sulfur dioxide in the flue gas.

Desulfurized flue gas, containing about 10% or less of the original sulfur dioxide content, is removed from the absorber through overhead line 14. An aqueous absorber effluent solution comprising ammonium bisulfite with small amounts of ammonium bisulfate, is removed from the base of absorber 11 through line 15. The ammonium bisulfate is due to the small amount of oxidation of sulfur from the tetravalent to the hexavalent state which takes place in the sulfur dioxide absorber 11, and to any $SO_3$ which may be present in the entering flue gas. This absorber effluent solution flows from line 15 into the holding tank 16.

An absorber effluent solution stream 17 is withdrawn from holding tank 16 at a substantially constant flow rate. This effluent solution stream is divided into two portions. The first and smaller portion, which is stream 18, is treated to liberate sulfur dioxide. The second and larger portion, stream 19, is used to prepare fresh absorbent solution as will be hereinafter described.

The first absorbent effluent stream 18 is introduced into acidifier 21, where it is reacted with excess ammonium bisulfate introduced in the molten state through recycle line 22. The sensible heat of the molten ammonium bisulfate stream maintains the acidifier at its desired operating temperature of about 200° to 225° F. Wet sulfur dioxide, i.e., a mixture of sulfur dioxide and water vapor, is liberated in acidifier 21 and withdrawn through overhead line 23. The water vapor may be separated from the sulfur dioxide by known means and the sulfur dioxide converted to either sulfur or sulfuric acid.

An aqueous slurry containing ammonium sulfate and ammonium bisulfate in solution plus solid phase ammonium sulfate is formed as a by-product in the acidifier 21. This slurry is withdrawn from the acidifier 21 through line 24, and is introduced into first stage decomposer 25. A preferred mode of operation is to inject the slurry into a hot combustion gas stream 26. The first stage decomposer, or decomposition zone, 25 is shown diagrammatically herein; suitable apparatus, such as that shown in the copending Welty application Ser. No. 7108, may be used. Water in the incoming slurry is evaporated, and the ammonium sulfate is decomposed into ammonium bisulfate. The decomposer 25 may be maintained at temperatures of about 650° to about 800° F.; at these temperatures little decomposition of ammonium bisulfate takes place. The ammonium bisulfate product may be collected in the molten form in a pool at the bottom of decomposer 25. This ammonium bisulfate product is withdrawn from the first stage decomposer through line 27. A mixture of combustion gas and gaseous decomposition products, i.e., ammonia and water vapor, is removed from decomposer 25 from overhead line 28.

The hot molten ammonium bisulfate stream 27 is split into two streams. The first and larger portion of the ammonium bisulfate is recycled to the acidifier 21 through line 22. The second and smaller portion of ammonium bisulfate is conveyed through line 29 to a second stage decomposer 30. The sulfate content of this stream 29 in moles per hour is equivalent to the rate of sulfate formation in moles per hour taking place in sulfur dioxide absorber 11 plus the moles per hour of $SO_3$ in flue gas entering absorber 11. The second stage decomposer or decomposition zone 30 may be heated by hot combustion gases introduced through line 31, or by other suitable means such as the passage of an electric current through a body of molten ammonium bisulfate in the second stage decomposer. The second stage decomposition products, which are entirely gaseous, consisting of nitrogen, ammonia, sulfur dioxide, and water vapor, plus combustion gases where hot combustion gas has been used as the heat source, is withdrawn through overhead line 32. The two decomposition gas streams 28 and 32 are merged into a single stream 33. This stream 33, and makeup ammonia in line 35, to compensate for ammonium salt decomposed in second stage decomposer 30 and for losses from the system, are introduced into the base of ammonia absorber or ammoniator 37. These gases contact the aqueous second portion of absorber effluent solution which is conveyed to the top of ammoniator 37 via line 19. Makeup water is added as required through line 38. The ammonia and the sulfur dioxide in the gas mixture react with the ammonium bisulfite to form fresh absorbent solution containing ammonium sulfite as the principal solute. This fresh absorbent solution is withdrawn from the ammonia absorber 37 through line 39. The temperature of the ammoniator 37 is maintained at the desired level of about 122° F. by means of a pumparound circuit which includes return line 40 and cooler 41. Part of the ammoniator bottoms in line 39 enters this pumparound circuit. The rest flows through line 42 back to the holding tank 12. Gases which are not absorbed, i.e., nitrogen, carbon monoxide, and small amounts of ammonia, are removed from the absorber 37 through overhead line 43.

This invention will now be described further with reference to a specific embodiment thereof as shown in the following example.

EXAMPLE

Referring to the drawing, flue gas containing about 0.23% by volume of sulfur dioxide and about 0.005% by volume of $SO_3$ is passed upwardly through sulfur dioxide absorber 11, where it is contacted with a downflowing stream of aqueous absorbent solution. This solution is essentially ammonium sulfite, with some ammonium bisulfite, ammonium sulfate and ammonium bisulfate present, containing typically about 16.4 moles of $NH_3$, 8.2 moles of $SO_2$ and 0.82 mole of $SO_3$ per 100 moles of water and having a pH of about 6.6. This absorbent solution is introduced into the absorber 11 via line 13. Absorber 11 is operated at 122° F. and substantially atmospheric pressure. Desulfurized flue gas is withdrawn overhead via line 14, and absorber effluent solution is withdrawn through line 15 and passed to holding tank 16. The absorber effluent solution is predominantly ammonium bisulfate with some ammonium bisulfate, containing typically about 15.8 moles of $NH_3$, 11.5 mole of $SO_2$ and 1.2 moles of $SO_3$ per 100 moles of water, and having a pH of about 5.3.

Absorber effluent solution is withdrawn from holding tank 16 via line 17, and is divided into two streams 18 and 19. Stream 18 flows to acidifier 21, and molten ammonium bisulfate is also introduced into acidifier 21 via line 22. The solution temperature in acidifier 21 is about 200° to 225° F. Sulfur dioxide and water vapor are removed overhead via line 23.

An aqueous slurry of ammonium sulfate, with some ammonium bisulfate, containing typically about 21% by volume of solids, flows from acidifier 21 to first stage decomposer 25 via line 14. The ammonium sulfate slurry is injected into a hot combustion gas stream 26, and the resulting mixture flows into decomposer 25. Hot molten salts, mostly ammonium bisulfate with small amounts of ammonium sulfate, is removed through line 27. An exit gas stream 28 containing ammonia, water vapor, and hot combustion gas is withdrawn overhead from the decomposer 25.

The molten salt stream 27 is divided into two streams 22 and 29. The larger stream 22 flows back to acidifier 21. The smaller stream 29 leads to a second stage decomposer 30, where the molten salt (mostly ammonium bisulfate) is decomposed into an entirely gaseous product mixture comprising ammonia, nitrogen, sulfur dioxide and water vapor. The second stage decomposer 30 is heated by hot gas, preferably a nonoxidizing gas formed by combustion of a fuel in a slight deficiency of air. The gaseous product mixture is removed through line 32. The gas streams 28 and 32 are merged into a single stream 33.

The decomposer gas stream 33 and makeup ammonia stream 35 are introduced into ammoniator 38. The portion of absorber effluent solution in line 19, diluted with makeup water in line 38, enters the top of ammoniator 37. The solution absorbs the ammonia and sulfur dioxide entering the ammoniator 37. The ammoniator bottoms is withdrawn through line 39. Part of this bottoms is recirculated to cool the ammoniator 37. The rest flows through line 39 back to holding tank 12, from which it is withdrawn as required in absorber 11.

Stream quantities in pound moles per hour are indicated in Table I below.

TABLE I

| Reference Numeral | Flue gas | $SO_2$ | $SO_3$ | $NH_3$ | $H_2O$ |
|---|---|---|---|---|---|
| 10 | [1] 229,300 | 541 | 2 | | [2] |
| 13 | | 1,096 | 109 | 2,181 | 13,300 |
| 14 | [3] | 54 | | 70 | [2] |
| 15 | | 1,534 | 160 | 2,111 | 13,300 |
| 18 | | 489 | 51 | 673 | 4,240 |
| 19 | | 1,045 | 109 | 1,438 | 9,060 |
| 22 | | | 890 | 890 | |
| 23 | | 489 | | | 1,240 |
| 24 | | | 941 | 1,563 | 3,000 |
| 26 | [4] 4,590 | | | | |
| 27 | | | 941 | 941 | |
| 28 | [4] 4,590 | | | 622 | [5] 3,000 |
| 29 | | | 51 | 51 | |
| 31 | [4] 1,690 | | | | |
| 32 | [4] 1,690 | 51 | | 17 | |
| 33 | [4] 6,280 | 51 | | 639 | [5] 3,000 |
| 35 | | | | 104 | |
| 38 | | | | | [6] |
| 42 | | 1,096 | 109 | 2,181 | 13,300 |
| 43 | [7] | | | | |

[1] Includes $SO_2$ and $SO_3$.
[2] Indicates saturated with water vapor.
[3] Combined flows of unabsorbed gas from flue gas stream 10 and ammoniator overhead 43.
[4] Hot combustion gas.
[5] Includes water from slurry but not from hot combustion gas.
[6] As required for material balance.
[7] Unabsorbed gas from stream 33.

The stream flows in lines 22 and 24, in terms of salt constituents, in pound moles per hour, are as follows:

| Constituent | Stream 22 | Stream 24 |
|---|---|---|
| Ammonium bisulfate (molten) | 890 | |
| Ammonium bisulfate (in solution) | | 319 |
| Ammonium sulfate (in solution) | | 270 |
| Ammonium sulfate (solid) | | 352 |
| Water | | 3,000 |

What is claimed is:

1. In a process for removing sulfur dioxide from flue gas which comprises:
   (a) contacting said flue gas with an aqueous absorbent solution containing ammonium sulfite as its principal solute in an absorption zone, whereby a major amount of the sulfur dioxide in said flue gas is absorbed in said solution and a minor amount of the tetravalent sulfur in said absorption zone is oxidized to the hexavalent state;
   (b) withdrawing the flue gas stream of reduced sulfur dioxide content and an absorber effluent solution comprising ammonium bisulfite and ammonium bisulfate;
   (c) acidifying a first portion of said absorber effluent solution with ammonium bisulfate, thereby liberating sulfur dioxide and forming an aqueous mixture containing ammonium sulfate and ammonium bisulfate;
   (d) evaporating the water in said aqueous mixture;
   (e) decomposing ammonium sulfate produced in step (c) into ammonium bisulfate and ammonia in a first stage decomposition zone; and
   (f) returning a major portion of said ammonium bisulfate to step (c) for acidification of said absorber effluent solution;
the improvement comprising:
   (g) decomposing a minor portion of the ammonium bisulfate produced in step (e) at a temperature of about 750° to about 950° F. in a second decomposition zone into a gaseous product mixture comprising ammonia, nitrogen, and sulfur dioxide, said minor portion of ammonium bisulfate being equivalent to the amount of tetravalent sulfur oxidized to the hexavalent state in the absorption zone plus the amount of sulfur trioxide in the flue gas entering said absorption zone; and
   (h) combining the gaseous product mixtures from steps (e) and (g) and contacting the combined gas mixture with a second portion of said absorber effluent solution thereby making fresh absorbent solution and recycling said solution to step (a).

2. A process according to claim 1 in which nonoxidizing conditions are maintained in said second stage decomposition zone.

References Cited

UNITED STATES PATENTS

| | | | |
|---|---|---|---|
| 1,740,342 | 12/1929 | Hansen | 23—178 S |
| 2,021,558 | 11/1935 | Lee et al. | 23—178 S |
| 2,082,006 | 6/1937 | Johnstone | 23—178 S |
| 2,405,747 | 8/1946 | Hixson | 23—178 R |
| 2,676,090 | 4/1954 | Johnstone | 23—178 R |
| 3,282,646 | 11/1966 | Bonfield et al. | 23—193 X |
| 3,321,275 | 5/1967 | Furkert et al. | 23—178 R |

OSCAR R. VERTIZ, Primary Examiner

C. B. RODMAN, Assistant Examiner

U.S. Cl. X.R.

473—541